United States Patent
Kozuma

(10) Patent No.: US 9,542,022 B2
(45) Date of Patent: Jan. 10, 2017

(54) TOUCH SENSOR AND METHOD FOR DRIVING THE SAME AND DISPLAY DEVICE

(75) Inventor: Munehiro Kozuma, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 565 days.

(21) Appl. No.: 12/861,496

(22) Filed: Aug. 23, 2010

(65) Prior Publication Data

US 2011/0043473 A1    Feb. 24, 2011

(30) Foreign Application Priority Data

Aug. 24, 2009 (JP) ................................ 2009-193248

(51) Int. Cl.
  *G06F 3/041* (2006.01)
  *G06F 3/042* (2006.01)

(52) U.S. Cl.
  CPC ............. *G06F 3/0412* (2013.01); *G06F 3/042* (2013.01)

(58) Field of Classification Search
  CPC .... G06F 3/0233; G06F 3/03547; G06F 3/041; G02F 1/13318; G06T 2207/10024; G09G 3/3648; G09G 3/3655; H01L 27/3244
  USPC ............................ 345/156–184; 382/190–208
  See application file for complete search history.

(56) References Cited

U.S. PATENT DOCUMENTS

| | | | |
|---|---|---|---|
| 6,747,290 B2 | 6/2004 | Yamazaki et al. | |
| 7,181,052 B2 | 2/2007 | Fujieda | |
| 7,336,260 B2 | 2/2008 | Martin | |
| 7,430,025 B2 | 9/2008 | Okamoto et al. | |
| 7,435,940 B2 | 10/2008 | Eliasson et al. | |
| 7,522,149 B2 | 4/2009 | Nakamura et al. | |
| 7,535,454 B2 | 5/2009 | Jasso | |
| 7,602,380 B2 | 10/2009 | Yoshida | |
| 7,674,650 B2 | 3/2010 | Akimoto et al. | |
| 7,751,600 B2 | 7/2010 | Yamazaki et al. | |
| 7,768,007 B2 | 8/2010 | Yamazaki et al. | |

(Continued)

FOREIGN PATENT DOCUMENTS

| | | |
|---|---|---|
| CN | 001582465 A | 2/2005 |
| CN | 001201261 C | 5/2005 |

(Continued)

OTHER PUBLICATIONS

Chinese Office Action (Application No. 201010267003.3) dated Dec. 4, 2013, with Full English Translation.

(Continued)

*Primary Examiner* — Kent Chang
*Assistant Examiner* — Gerald Oliver
(74) *Attorney, Agent, or Firm* — Fish & Richardson P.C.

(57) ABSTRACT

It is an object to suppress malfunction of a touch sensor, a touch panel, and a device using them by accurate determination whether inputting is performed or not. In addition, it is also an object to enhance the response speed of the determination. A touch panel including a plurality of pixels having photosensors and an image processing portion are included. The photosensor forms a contact image of a portion of an object which touches the touch panel. The image processing portion calculates the area of the contact portion from color data of the contact image and determines on the basis of the area whether inputting to the touch panel is performed or not.

8 Claims, 13 Drawing Sheets

(56) References Cited

U.S. PATENT DOCUMENTS

| | | |
|---|---|---|
| 7,800,594 B2 | 9/2010 | Nakamura |
| 7,808,488 B2 | 10/2010 | Martin |
| 7,920,215 B2 | 4/2011 | Okamoto et al. |
| 8,101,950 B2 | 1/2012 | Yamazaki et al. |
| 8,159,461 B2 | 4/2012 | Martin |
| 8,179,463 B1* | 5/2012 | Geurts .............. 348/296 |
| 8,243,027 B2 | 8/2012 | Hotelling et al. |
| 8,248,363 B2 | 8/2012 | Anastas |
| 8,259,078 B2 | 9/2012 | Hotelling et al. |
| 8,274,489 B2* | 9/2012 | Chuang et al. .......... 345/173 |
| 8,432,371 B2 | 4/2013 | Hotelling et al. |
| 8,451,244 B2 | 5/2013 | Hotelling et al. |
| 8,493,334 B2 | 7/2013 | Takashima |
| 8,552,989 B2 | 10/2013 | Hotelling et al. |
| 8,619,208 B2 | 12/2013 | Gosain et al. |
| 8,654,083 B2 | 2/2014 | Hotelling et al. |
| 8,704,804 B2 | 4/2014 | Yamaguchi et al. |
| 9,244,561 B2 | 1/2016 | Hotelling et al. |
| 9,268,429 B2 | 2/2016 | Hotelling et al. |
| 2002/0129658 A1* | 9/2002 | Rider ............. G01B 11/16 73/762 |
| 2003/0044051 A1* | 3/2003 | Fujieda ............ 382/124 |
| 2004/0040800 A1 | 3/2004 | Anastas |
| 2004/0041773 A1* | 3/2004 | Takeda et al. ......... 345/98 |
| 2004/0189621 A1* | 9/2004 | Cho et al. ........... 345/179 |
| 2005/0162398 A1 | 7/2005 | Eliasson et al. |
| 2006/0228974 A1* | 10/2006 | Thelss et al. .......... 445/24 |
| 2007/0034783 A1 | 2/2007 | Eliasson et al. |
| 2007/0120833 A1 | 5/2007 | Yamaguchi et al. |
| 2007/0246725 A1* | 10/2007 | Yamazaki ............ 257/98 |
| 2007/0262965 A1 | 11/2007 | Hirai et al. |
| 2008/0035435 A1 | 2/2008 | Anastas |
| 2008/0036736 A1 | 2/2008 | Anastas |
| 2008/0041671 A1 | 2/2008 | Anastas |
| 2008/0167526 A1 | 7/2008 | Crank et al. |
| 2008/0212892 A1* | 9/2008 | Doida et al. .......... 382/274 |
| 2009/0167723 A1* | 7/2009 | Kwong et al. ........ 345/175 |
| 2009/0297024 A1* | 12/2009 | Dai ................. 382/165 |
| 2010/0085331 A1 | 4/2010 | Kurokawa et al. |
| 2010/0134457 A1* | 6/2010 | Katoh et al. .......... 345/207 |
| 2010/0134735 A1 | 6/2010 | Nakamura et al. |
| 2013/0027324 A1 | 1/2013 | Martin |
| 2016/0117023 A1 | 4/2016 | Hotelling et al. |

FOREIGN PATENT DOCUMENTS

| | | |
|---|---|---|
| CN | 001815426 A | 8/2006 |
| CN | 101344828 A | 1/2009 |
| EP | 1635250 A2 | 3/2006 |
| EP | 1772800 A | 4/2007 |
| EP | 1811360 A | 7/2007 |
| EP | 1965291 A2 | 9/2008 |
| EP | 2259172 A | 12/2010 |
| EP | 2261782 A | 12/2010 |
| EP | 2330491 A | 6/2011 |
| EP | 2330492 A | 6/2011 |
| EP | 2330493 A | 6/2011 |
| EP | 2330494 A | 6/2011 |
| JP | 04-278627 A | 10/1992 |
| JP | 10-028777 A | 2/1998 |
| JP | 2001350586 A | 12/2001 |
| JP | 2003-075135 A | 3/2003 |
| JP | 2003-346162 A | 12/2003 |
| JP | 2004-055590 A | 2/2004 |
| JP | 2004-318819 A | 11/2004 |
| JP | 2005-520239 | 7/2005 |
| JP | 2005-275644 A | 10/2005 |
| JP | 2006053663 A | 2/2006 |
| JP | 2006-072854 A | 3/2006 |
| JP | 2007-128497 A | 5/2007 |
| JP | 2007-194958 A | 8/2007 |
| JP | 2008-097172 A | 4/2008 |
| JP | 2009-093154 A | 4/2009 |
| JP | 2009-540374 | 11/2009 |
| KR | 2007-0038430 A | 4/2007 |
| TW | M343209 | 10/2008 |
| WO | WO03038800 A1 | 5/2003 |
| WO | WO-03/077192 | 9/2003 |
| WO | WO2004042685 A2 | 5/2004 |
| WO | WO2004042693 A1 | 5/2004 |
| WO | WO-2004/081502 | 9/2004 |
| WO | WO-2004/081956 | 9/2004 |
| WO | WO-2007/146779 | 12/2007 |
| WO | WO-2007/146780 | 12/2007 |
| WO | WO-2007/146783 | 12/2007 |
| WO | WO-2007/146785 | 12/2007 |

OTHER PUBLICATIONS

Taiwanese Office Action (Application No. 099127589) Dated Dec. 29, 2014.

Korean Office Action (Application No. 2010-0080623) Dated Jun. 15, 2016.

* cited by examiner

FIG. 9A

| 901 | | | | |
|---|---|---|---|---|
| H=250 S=200 V=200 | 250 210 210 | 250 220 205 | 250 50 34 | 250 30 29 |
| 250 190 185 | 250 195 210 | 250 205 210 | 250 90 76 | 250 110 93 |
| 250 200 200 | 250 210 210 | 250 100 70 | 250 50 34 | 250 205 210 |
| 250 50 34 | 250 30 29 | 250 50 34 | 250 198 124 | 250 220 205 |
| 250 80 69 | 250 50 34 | 250 190 185 | 250 195 210 | 250 205 210 |

| 901 | | | | |
|---|---|---|---|---|
| 1 | 1 | 1 | 0 | 0 |
| 1 | 1 | 1 | 0 | 0 |
| 1 | 1 | 0 | 0 | 1 |
| 0 | 0 | 0 | 1 | 1 |
| 0 | 0 | 1 | 1 | 1 |

|  |  | 1101 | 1102 | 1103 |  | 1104 |  |  |
|---|---|---|---|---|---|---|---|---|
| 0 | 0 | 0 | 0 | 0 | 0 | 0 | 0 | 0 |
| 0 | 0 | 1 | 1 | 1 | 1 | 0 | 0 | 0 |
| 0 | 1 | 1 | 1 | 1 | 1 | 0 | 0 | 0 |
| 0 | 0 | 1 | 1 | 1 | 0 | 0 | 0 | 0 |
| 0 | 0 | 0 | 0 | 0 | 0 | 0 | 0 | 0 |
| 1105— 0 | 1 | 1 | 0 | 0 | 1 | 1 | 1 | 0 |
| 1106— 0 | 1 | 1 | 0 | 0 | 1 | 1 | 1 | 0 —1107 |
| 0 | 0 | 0 | 0 | 0 | 1 | 1 | 1 | 0 |
| 0 | 0 | 0 | 0 | 0 | 0 | 0 | 0 | 0 |

FIG. 11B

|  |  | 1101 | 1102 | 1103 |  | 1104 |  |  |
|---|---|---|---|---|---|---|---|---|
| 0 | 0 | 0 | 0 | 0 | 0 | 0 | 0 | 0 |
| 0 | 0 | 1 | 1 | 1 | 1 | 0 | 0 | 0 |
| 0 | 1 | 1 | 1 | 1 | 1 | 0 | 0 | 0 |
| 0 | 0 | 1 | 1 | 1 | 0 | 0 | 0 | 0 |
| 0 | 0 | 0 | 0 | 0 | 0 | 0 | 0 | 0 |
| 1105— 0 | 2 | 2 | 0 | 0 | 3 | 3 | 3 | 0 |
| 1106— 0 | 2 | 2 | 0 | 0 | 3 | 3 | 3 | 0 —1107 |
| 0 | 0 | 0 | 0 | 0 | 3 | 3 | 3 | 0 |
| 0 | 0 | 0 | 0 | 0 | 0 | 0 | 0 | 0 |

TOUCH SENSOR AND METHOD FOR DRIVING THE SAME AND DISPLAY DEVICE

BACKGROUND OF THE INVENTION

1. Field of the Invention

The technical field relates to a touch sensor. In addition, the technical field relates to a touch panel, a display portion of which includes a touch sensor, and a display device including a touch panel.

2. Description of the Related Art

In recent years, the market of liquid crystal displays and electroluminescence (EL) displays has grown, and the importance of the added value of panels has been increasing. Above all, touch panels with display portions including touch sensors have attracted attention as user interfaces and have been introduced into mobile devices such as portable game machines.

Further, it is proposed that personal authentication is performed with a touch sensor provided in a device which does not necessarily have a display portion, such as a fingerprint authentication device.

For example, a touch panel which can receive information by detecting light reaching a display screen with a photosensor provided in a pixel of a display portion has been developed (e.g., Patent Document 1).

In the touch panel including such kind of photosensor, the following techniques are proposed: a technique in which a change in amount of light by shadow of a finger, an object, or the like projected on a display screen is detected with a photo diode provided in a pixel as a photosensor for example; and a technique in which a change in amount of light caused by light from a light-emitting object such as a light pen is detected with a photo diode provided in a pixel as a photosensor for example.

[Reference]

[Patent Document 1] Japanese Published Patent Application No. 2004-318819

SUMMARY OF THE INVENTION

It is an object to suppress malfunction of a touch sensor, a touch panel, and a device using them by correct detection of inputs.

Alternatively, it is an object to shorten time for detecting inputs.

An embodiment of a touch sensor has an input portion including a photosensor and has a feature of detecting inputs to a touch sensor by taking advantage of the change of an object's color when the object touches the input portion.

In the case where the object is a human finger, a detection method takes advantage of difference in finger color between before and after the finger touches the input portion, that is, change in color between red and pink or white though the color varies among different individuals.

Specifically, the detection method is as follows: a finger image is formed by a photosensor, the area of a contact portion is calculated by analyzing color data of the image by an image process, and an input to the touch sensor is detected based on the area data.

The touch sensor can be applied to a display device by including a touch panel as its input portion.

An embodiment of the present invention is a display device including a touch panel in which photosensors are provided in a plurality of pixels and an image processing portion. The photosensor forms a contact image of a portion where a touch panel is touched by the object. In the image processing portion, the area of a contact portion is calculated from color data of the contact image and an input to the touch panel is detected based on the area. The contact image is an image of the object touching the touch panel.

Further, another embodiment of the present invention is a display device including a touch panel including photosensors in a plurality of pixels and an image processing portion including an input process portion and a response process portion. The photosensor forms a contact image of a portion where a touch panel is touched by the object. In the input process portion, the area of a contact portion is calculated from color data of the contact image. The response process portion detects an input to the touch panel based on the area.

Another embodiment of the present invention is a display device including a touch panel including photosensors in a plurality of pixels and an image processing portion including an input process portion and a response process portion. The photosensor forms a contact image of a portion where a touch panel is touched by the object. In the input process portion, the area of the contact portion is calculated by subjecting color data of the contact image to the following process: a converting process from RGB value to HSV value, a binarizing process, a noise removing process (also referred to as a noise filtering process), and a labeling process. The response process portion detects an input to the touch panel based on the area.

Alternatively, a threshold value may be set for an area and an input to a touch panel may be detected depending on the result of the comparison between the threshold value and the area. The case where the area is larger than the threshold value is defined that inputting is performed and the case where the area is equal to or less than the threshold value is defined that inputting is not performed. It is also acceptable that the case where the area is equal to or larger than the threshold value is defined that inputting is performed and the case where the area is less than the threshold value is defined that inputting is not performed.

Alternatively, a plurality of threshold values are set with respect to the area and an input to the touch panel is detected in multi-level by a comparison between the area and threshold values.

Note that as another embodiment of an image process may be as follows: the amount of change in color data of images before and after a touch panel is touched by an object is analyzed, whereby the area of a contact portion is calculated.

In a touch sensor, a touch panel, and a device including them, malfunction can be suppressed by accurate detection of inputs.

In addition, an image process can be effectively performed and time for detecting inputs can be shortened.

BRIEF DESCRIPTION OF THE DRAWINGS

In the accompanying drawings:

FIGS. 9A and 9B illustrate an image process;
FIGS. 10A and 10B illustrate an image process;
FIGS. 11A and 11B illustrate an image process;

DETAILED DESCRIPTION OF THE INVENTION

Figure 1:
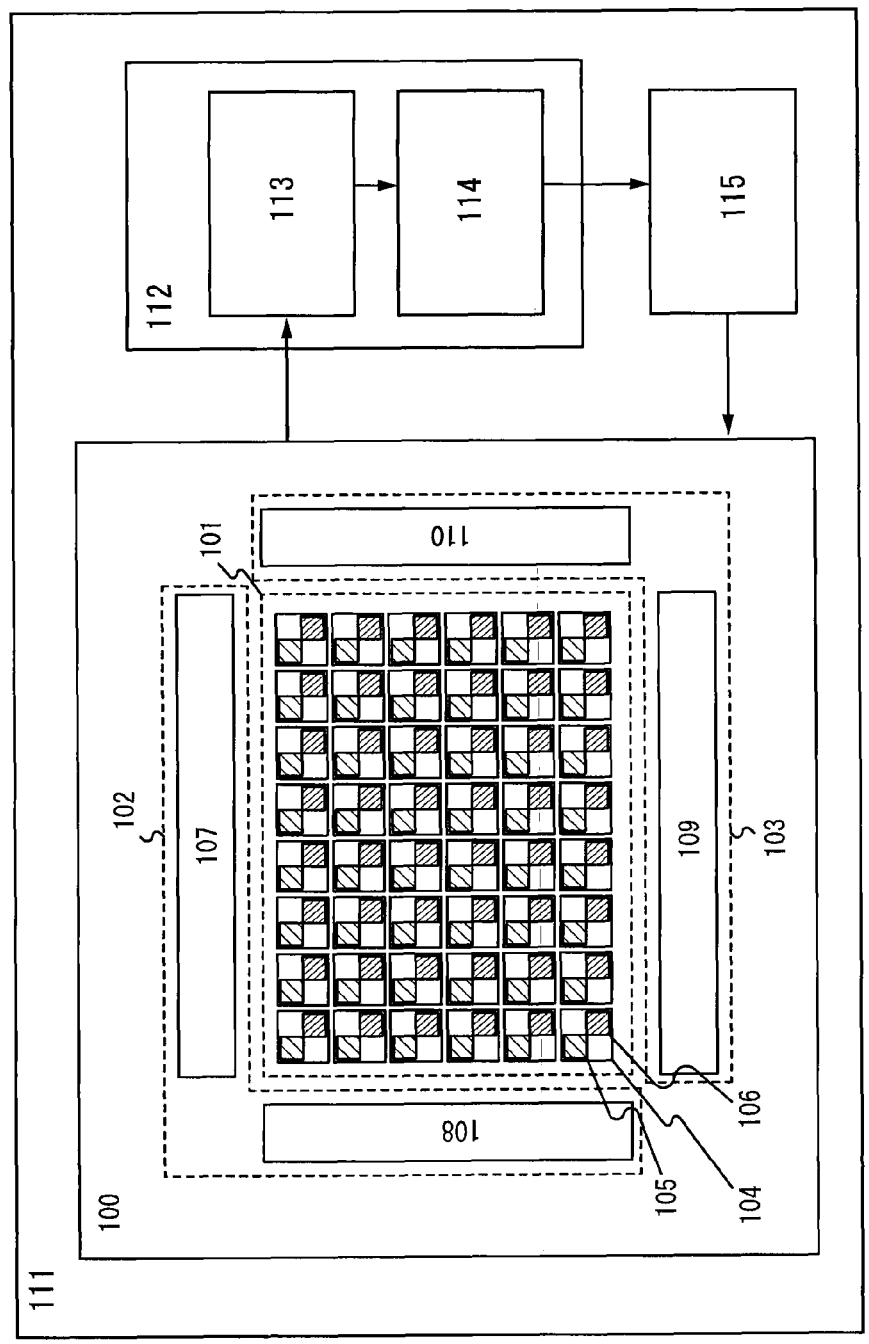
FIG. 1 illustrates a structure of a touch panel.

The embodiments will be described with reference to the drawings. Note that the present invention is not limited to the description given below. It is easily understood by those skilled in the art that modes and details disclosed herein can be modified in various ways without departing from the spirit and the scope of the present invention. Therefore, the invention should not be construed as being limited to the description in the following embodiments. Note that in structures of the present invention described hereinafter, the same portions or portions having similar functions are denoted by the same reference numerals in different drawings, and description thereof is not repeated.

(Embodiment 1)

Embodiment 1 illustrates a display device including a touch panel and a method for driving the touch panel with reference to FIG. 1.

FIG. 1 is an example of a block diagram of a display device including a touch panel.

A display device 111 includes a touch panel 100, an image processing portion 112 including an input process portion 113 and a response process portion 114, and an image synthesis portion 115. A structure of the display device illustrated here is an example and a structure is not limited to this.

The touch panel 100 includes a plurality of pixels 104 provided in matrix. A display element 105 and a photosensor 106 are provided in each pixel 104. A photosensor 106 is a light-receiving element such as a photo diode. Note that the photosensor 106 can be provided outside the pixel 104. Further, the number of photosensors 106 can be different from that of display elements 105.

This embodiment describes an example in the case where an object that touches the touch panel 100 is a person's finger; however, this embodiment is not limited thereto.

When a finger touches the touch panel 100, the touch panel 100 is scanned by the photosensor 106 provided in each pixel 104 so as to convert a received light into an electrical signal, whereby a contact image of a portion where the touch panel 100 is touched by the finger is formed. The formed contact image is inputted to the input process portion 113 of the image processing portion 112. Note that light which the photosensor 106 receives is light emitted from inside (such as a back light) of a display device and reflected by an object, outside light or the like reflected by an object, light emitted from an object itself, light which is outside light blocked by an object, or the like.

In the input process portion 113, color of a contact image is determined and the area of a contact portion is calculated from color data of the contact image. The calculated area is transmitted to the response process portion 114. Since there is a proportional relationship between the area and an input pressure, an input can be easily detected based on the area. Input pressure calculated from the area may be used in a later process; in which case, a circuit for calculating the input pressure may be provided.

The response process portion 114 sets a predetermined threshold value with respect to the calculated area. The case where the area is larger than the predetermined threshold value, it is determined that inputting is performed, and the case where the value of the area is equal to or less than the predetermined threshold value, it is determined that inputting is not performed. Note that the response process portion 114 may have a function for setting a threshold value automatically.

When the inputting is determined to be performed, the response process portion 114 forms a response image which shows that inputting is performed and outputs the response image to the image synthesis portion 115.

The image synthesis portion 115 makes the response image and an image displayed in the touch panel 100 overlap with one another in order to form a synthesis image, and outputs the synthesis image to the touch panel 100.

Then, the touch panel 100 displays the synthesis image and transmits completion of inputting. A response image and synthesis image are not necessarily formed, and whether inputting is performed or not may be transmitted by a voice, a lamp, or the like. Alternatively, a response image may be output to the touch panel 100 without forming a synthesis image. In the case where a response image and a synthesis image are not formed, the image synthesis portion 115 is not needed.

Further, in the response process portion 114, when inputting is determined as not to be performed, the fact that inputting is not performed may be transmitted.

In this manner, the touch panel in this embodiment can correctly determine inputting by a photosensor and an image process and can prevent malfunction.

Further, this embodiment describes a touch panel in which display is performed, but a structure in which display is not performed is also acceptable. In such a case, a touch sensor including a photosensor is provided in the input portion and an input is detected by analysis of the image processing portion described in this embodiment.

This embodiment can be implemented by combining it with any of the other embodiments as appropriate.

(Embodiment 2)

This embodiment describes an example of an image process and a response process with reference to FIG. 1, FIG. 8, FIGS. 9A and 9B, FIGS. 10A and 10B, and FIGS. 11A and 11B. The description up to the stage in which an image of an object is formed is omitted due to being the same description as that in Embodiment 1. In this embodiment, an image of a finger as an object after the finger has touched a touch panel is processed. Note that the object is not limited to a finger.

Figure 8:
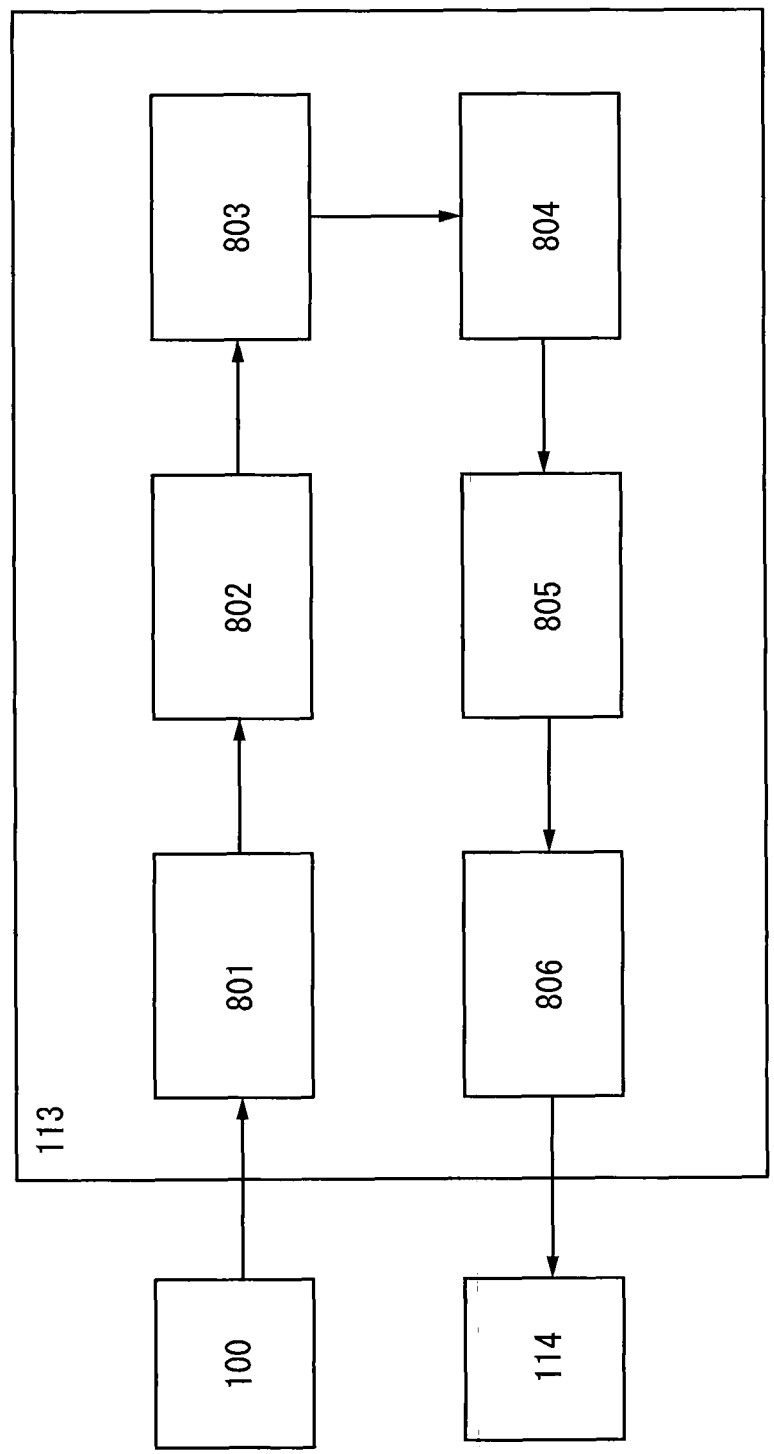
FIG. 8 illustrates an image process.

The formed image is processed by the image processing portion 112 of the input process portion 113 in FIG. 1. FIG. 8 illustrates an example of a block diagram of the input process portion 113.

In the input process portion 113, when an image is input from the touch panel 100, a HSV conversion process 801, a binarizing process 802, a noise filtering process 803, a labeling process 804, an area and location data calculation process 805, and a feature amount extraction process 806 are performed, and the image is output to the response process portion 114. Each process is described in detail herein.

First, the HSV conversion process 801 is performed. A brightness value of a component of each color, red (R), green (G), and blue (B) is extracted from an inputted image.

Then, the extracted color data of RGB is converted into color data based on HSV which consists of three components: hue (H), saturation (S), and value (V). Hue (a real number which is 0 or more and less than 360) shows a kind of color. Saturation (a real number which is 0 or more and 1 or less) shows vividness of color. Value (a real number which is 0 or more and 1 or less) shows brightness of color.

Since tones of color of an image can be detected by using HSV as the standard, detection of an input can be performed correctly by comparison with RGB. Note that, it is acceptable that an image process is performed in RGB without conversion into HSV. It is also acceptable that the image process is performed in another format other than HSV.

RGB is converted into HSV as described below.

An extracted brightness value of RGB is represented as (R, G, B) and has a maximum value (MAX) and a minimum value (MIN) (each of R, and B is an actual value which is 0 or more and 1 or less).

When MAX is equal to R, hue is calculated by formula 1:

$$H=60\times(G-B)/(MAX-MIN)+0.$$

In addition, when MAX is equal to hue is calculated by formula 2:

$$H=60\times(B-R)/(MAX-MIN)+120.$$

In addition, when MAX is equal to B, hue is calculated by formula 3:

$$H=60\times(R-G)/(MAX-MIN)+240.$$

Further, the following formulas also hold: S=(MAX−MIN)/MAX (formula 4) and V=MAX (formula 5).

Note that when H has a negative value, a value of 360 is added to H.

As an example, the case of red expressed by (R, G, B)=(1, 0, 0), in which MAX=R=1 and MIN=0, is given. According to formula 1, H=60×(0−0)/(1−0)+0=0. In addition, according to formula 4, S=(1−0)/1=1. According to formula 5, V=1. That is, (H, S, V)=(0, 1, 1) is obtained. This value shows that this color is the vividest and brightest red.

As another example, the case of yellow expressed by (R, B)=(1, 1, 0), in which MAX=R or G=1 and MIN=0, is given. Formula 1 or formula 2 is applied. When formula 1 is applied, H=60×(1−0)/(1−0)+0=60 is obtained. When formula 2 is applied, H=60×(0−1)/(1−0)+120=60 is obtained. In either case, the value of H is the same. In addition, according to formula 4, S=(1−0)/1=1. According to formula 5, V=1. That is, (H, S, V)=(60, 1, 1) is obtained.

In this embodiment, such color data conversion from RGB to HSV is performed and the HSV value is used for the image process.

In the subsequent processes, H can be an integer from 0 to 359.

In addition, S and V are expressed by real numbers from 0 to 1 upon conversion. However, for convenience in the use of data, values which S and V can be are redetermined so as to be integers from 0 to 255 by multiplying the value range by 255.

Note that a maximum value in determination of an integer is not limited to 255. In addition, processing can be performed without the redetermination.

Next, the binarizing process 802 is performed on an image converted into an HSV value.

The binarizing process 802 is a process in which an HSV value of each pixel is divided into two by the threshold value after a threshold value condition is set for an HSV value. The binarizing process 802 is performed on all of the pixels in the image in a pixel unit.

Specifically, an HSV value of each pixel divided into two values is expressed by a binary variable of one bit (0 or 1).

For example, the case where a binary variable is "1" shows that an HSV value satisfies the threshold value condition. The case where a binary variable is "0" shows that an HSV value does not satisfy the threshold value condition. Note that an expression of the binary variable may be switched between 0 and 1.

Specifically, a binarizing process is performed with the use of each of the factors, hue (H), saturation (S), and value (V), as a condition value.

By setting a threshold value for each of hue (H), saturation (S), and value (V), a region which is desirably extracted is defined.

Each threshold value is preferably set to a value which can extract just the object that should be recognized.

First, hue (H) shows a kind of color. When a color of the object is a specific color, a condition in which just the specific color is extracted may be selected by a threshold value of hue (H).

Note that a threshold value of hue (H) is not necessarily set when the color is not particularly limited.

Further, saturation (S) shows vividness of color. When a vividness of an object is a specific vividness, a condition in which just the specific vividness is extracted may be selected by a threshold value of saturation (S).

Note that a threshold value of saturation is not necessarily set when the vividness is not particularly limited.

Furthermore, value (V) shows brightness of color. When a brightness of an object is a specific brightness, a condition in which just the specific brightness is extracted may be selected by a threshold value of value (V).

Note that a threshold value of value (V) is not necessarily set when the brightness is not particularly limited.

Hue (H) of a finger is approximately 0 to 30, which is included in the range of red; therefore, a threshold value for extraction of red is set.

Saturation (S) of the finger is affected by peripheral light. An image of the finger formed by a photosensor is changed depending on a brightness of peripheral light. Therefore, a threshold value is set in accordance with the strength of the peripheral light.

Similarly, value (V) of the finger is affected by peripheral light. An image of the finger formed by a photosensor is changed depending on a brightness of peripheral light. Therefore, a threshold value is set in accordance with the strength of the peripheral light.

The range of each threshold value can be automatically set by the distribution trend of pixel values of histogram, which determined by utilizing various HSV histograms of a whole image.

In the description below of a binarizing process, a binary variable of "1" shows the case where a condition of a threshold value is satisfied, and a binary variable of "0" shows the case where a condition of the threshold value is not satisfied.

For example, FIGS. 9A and 9B illustrate the case where a region in which a pixel value for an image is a hue (H) larger than 200, a saturation (S) larger than 150, and a value (V) larger than 100 remains.

FIG. 9A is a part of the image and depicts the values of hue (H), saturation (S), and value (V) of each pixel.

FIG. 9B depicts the values obtained after conversion of an image illustrated in FIG. 9A into binary variables performed in accordance with the following standards: hue (H) is larger than 200, saturation (S) is larger than 150, and value (V) is larger than 100.

For example, in FIG. 9A, a pixel 901 shows (H, S, V)=(250, 200, 200) and satisfies the condition of the threshold value: hue (H) is larger than 200, saturation (S) is larger than 150, and value (V) is larger than 100. Therefore, a binary variable of the pixel 901 in FIG. 9B after processing is "1".

Meanwhile, a pixel 902 shows (H, S, V)=(250, 50, 34) and does not satisfy the condition; therefore, a binary variable of the pixel 902 after processing is "0".

Similarly, a binarizing process is performed on all the pixels. Here, threshold values are set with respect to each of H, S, and V, but two or less of H, S, and V are also acceptable.

Color data needed for an image process is compressed into 1 bit by a binarizing process as illustrated by FIGS. 9A and 9B, whereby the amount of data can be dramatically reduced.

Further, reduction of the amount of data allows the size of subsequent image process circuits to be reduced.

Next, the noise filtering process 803 is performed on an image subjected to the binarizing process (FIG. 8).

The noise filtering process is an operation for elimination of noise images included in an image, and is performed on all the pixels in the image of the pixel unit.

The result of a median filter process is calculated from the distribution of pixel values of a pixel to be an object and a plurality of pixels around the pixel.

Here, the noise filtering process, which is generally called median filter process, is performed.

The median filter process is described below with reference to FIGS. 10A and 10B.

Figures 10A, 10B:
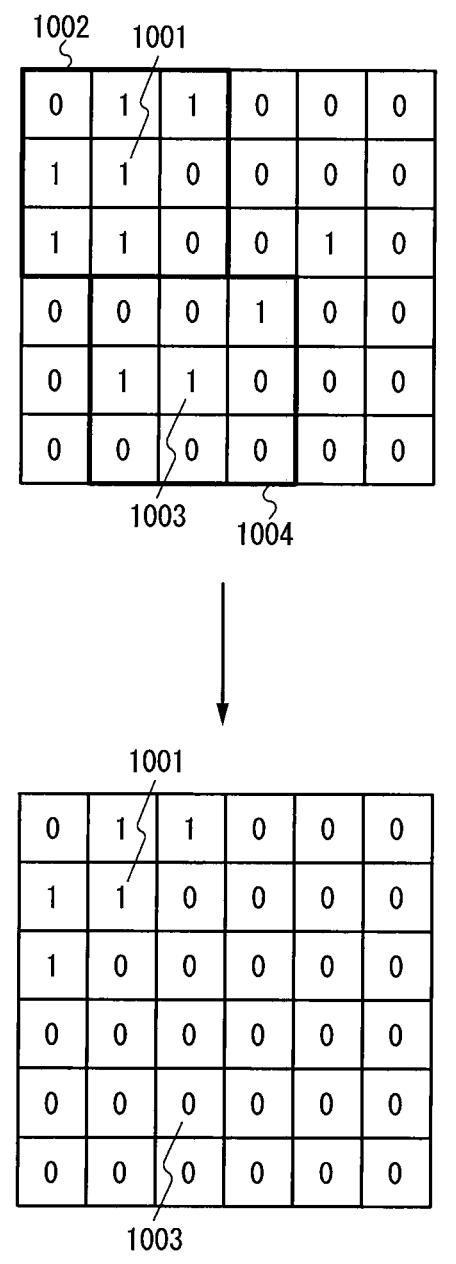

FIG. 10B illustrates the result obtained by performing the median filter process on an image with pixel values illustrated in FIG. 10A.

As a first step of the median filter process, values of pixels arranged in 3 rows and 3 columns centered on a pixel which becomes an object is inputted. Pixels are not necessarily arranged in 3 rows and 3 columns: arranging pixels in 5 rows and 5 columns or the like is also acceptable.

As the next step of the median filter process, input values of 9 pixels arranged in 3 rows and 3 columns are arranged in ascending order or descending order by a sort process, and a medium value of the 9 input values which are rearranged is outputted as a processing result.

For example, a pixel 1001 in FIG. 10A is subjected to the median filter process. Numeric values of pixels in a region 1002 in which the pixels are arranged in 3 rows and 3 columns and the pixel 1001, as the center thereof, are {0, 1, 1, 1, 1, 0, 1, 1, 0}. When the values are rearranged in ascending order, the numeric values are {0, 0, 0, 1, 1, 1, 1, 1, 1}. The medium value is "1" which results from arranging in ascending order, so that after processing, a numeric value of the pixel 1001 is "1" as illustrated in FIG. 10B.

Further, a pixel 1003 in FIG. 10A is subjected to the median filter process. Numeric values of pixels in a region 1004 in which the pixels are arranged in 3 rows and 3 columns and the pixel 1003, as the center thereof, are {0, 0, 1, 1, 1, 0, 0, 0, 0}. When the values are rearranged in ascending order, the numeric values are {0, 0, 0, 0, 0, 0, 1, 1, 1}. The medium value is "0" which results from arranging in ascending order, so that after processing, a numeric value of the pixel 1003 is "0" as illustrated in FIG. 10B.

In such a manner, processing is performed on each of the pixels. It is not necessary to output the medium value of input values. It is also acceptable that the fourth value or the sixth value is outputted and that the accuracy of the filter process is adjusted.

Note that since pixels in the periphery of the diagram illustrated in FIG. 10A do not have the necessary region in which pixels are arranged in 3 rows and 3 columns, the data is outputted without the process being performed. The pixels in the periphery of the diagram are pixels in a first column, a sixth column, a first row, and a sixth row (twenty pixels), for example.

The median filter process is especially effective in removing small noise.

Further, since an isolated noise becomes an object in a later labeling process, it is possible to reduce the number of labeling processes by removing the noise by the median filter process.

In the noise filtering process, a plurality of processing methods exists in addition to the median filter process, and any of them may be employed.

Next, a labeling process is performed on the image which has been subjected to the noise filtering process.

A labeling process is used as one of the methods for grouping part of a region in the image. Grouping allows later processing to be performed on a group unit.

In this embodiment, a labeling process is performed on all the pixels in an image of a pixel unit and is performed as follows: a pixel value of a pixel in an predetermined position and pixel values of a plurality of pixels in a vicinity of the pixel are compared to each other, and the same label value (region number) is added to pixels with the same pixel data.

An image subjected to a labeling process is expressed by binary variables, "0" or "1".

The label value of a pixel whose binary variable is "0" is "0", so that grouping is not performed.

On the other hand, an integer value "1" or more is given as the label value of a pixel whose binary variable is "1", so that pixels with the same label values are grouped.

There are three conditions below for giving a label value to a pixel whose binary variable is "1".

As a first condition, a new label value is given in the case where an adjacent pixel does not exist, a label value of an adjacent pixel is "0", or a label value of an adjacent pixel is not given.

As a second condition, in the case where a label value is not given and one of the adjacent pixels has a label value which is "1" or more, the same label value of the adjacent pixel is given.

As a third condition, in the case where the adjacent pixels have at least two different label values, the same value as the minimum label value is given.

Here, an adjacent pixel means eight pixels which are in contact with one pixel.

A specific operation of a labeling process will be described with reference to FIGS. 11A and 11B.

FIG. 11A is an image before a labeling process is performed and each of the pixels is expressed by a binary variable.

In an image in FIG. 11A, pixels are scanned from the upper left and are each given label values. FIG. 11B is an image after a labeling process. Diagrams illustrating the process of a labeling process are omitted.

First, the binary variable of a pixel 1101 is "0". Therefore, the label value of the pixel 1101 is "0". In later processing of a pixel whose binary variable is "0", the label value is similarly "0".

Next, the binary variable of a pixel 11102 is "1". When the pixel 1102 is processed, the label value of an adjacent pixel is "0", or is not given. Therefore, the new label value "1" is given in accordance with the first condition.

Next, the binary variable of a pixel 1103 which is adjacent to the right side of the pixel 1102 is "1". When the pixel 1103 is processed, the label value of the pixel 1102 is "1" and the label values of the other adjacent pixels are "0", or are not given. That is, the pixel 1103 is adjacent to the pixel 1102 whose label value is "1" or more. Therefore, the label value "1" which is the same as the label value of the pixel 1102 is given in accordance with the second condition.

Similarly, a label value "1" is allocated to each pixel in a pixel group 1104.

Further, in FIG. 11A, a pixel 1105 whose binary variable is "1" has an adjacent pixel whose label value is "0", or is not given. Therefore, a new label value is given in accordance with the first condition. Here, each pixel in the pixel group 1104 already has a label value "1". Therefore, a label value "2" is given to the pixel 1105.

Similarly, a label value "2" is given to each pixel in a pixel group 1106.

Further, a label value "3" is given to each pixel in a pixel group 1107 in a similar manner.

As thus described, pixels with the same label value can be grouped by giving label values. Grouping is performed, whereby in later processing, a region can be selected by designation of a label value and it is very easy to process images such as separation of images and partial synthesis of images.

Next, the image given a label value is subjected to the area and location data calculation process 805 (FIG. 8).

Area information can be obtained by counting the number of pixels having the same label value. Further, since location information shows the center of gravity of the area, location information can be calculated from the coordinate positions of pixels having the same label value and the area of pixels having the same label value.

Further, area information effectively functions for determining whether an image should be recognized or is unnecessary. As an unnecessary image, part or all of an image which becomes noise in an image process is given. Noise has a feature in that its area is smaller than the area of an image which should be recognized. Therefore, a threshold value of area is set and an image with the area exceeding the threshold value is selected, so that noise can be eliminated.

Next, a feature amount extraction process can be performed on the image having a label value.

The feature amount is a feature of an image, which can be expressed by numeric value, such as the degree of circularity.

Further, the degree of circularity expresses how near an image is to being a circle.

For example, when a surface of a panel is pressed by a finger, a portion touched by the finger takes a shape which is near to that of a circle.

The degree of circularity is given as a threshold value of an image, so that the finger can be detected more accurately.

A threshold value of the area and a threshold value of the feature amount are both set, so that detection accuracy can be enhanced.

Note that the feature amount extraction process need not be performed. In such a case, the area information and the location information are outputted.

The input process portion 113 outputs the obtained area information and the obtained location information of the image to the response process portion 114 (FIG. 1 and FIG. 8).

The response process portion 114 determines whether inputting is performed or not based on the area information and the location information and gives feedback about the result to the touch panel 100.

A mistaken input prevention function will be described as one example of response processing.

A mistaken input prevention function is a function for determining that inputting is not performed when a user unintentionally touches a touch panel.

When a user unintentionally touches a touch panel, a finger is not pressed against the touch panel but slightly touched, so that the area of a finger detected is small.

Therefore, a threshold value of the area is set. By a comparison between the area and a threshold value, it can be determined whether a finger is pressed against or unintentionally touched to the touch panel.

For example, the case where input is determined by the area information in FIG. 11B will be described.

In FIG. 11B, a finger is pressed against the place of the pixel group 1104 and a finger is unintentionally touched to the places of the pixel groups 1106 and 1107.

The pixel group 1104 has the area of 12, the pixel group 1106 has the area of 4, and the pixel group 1107 has the area of 9. Therefore, for example, the threshold value of the area is set to be 10, and each area and the threshold value are compared.

When the area of the pixel group 1104 exceeds the threshold value, it is determined that the finger is pressed against the touch panel. When the area of each of the pixel groups 1106 and 1107 is equal to or less than the threshold value, it can be determined that the finger is unintentionally touched to the touch panel.

Accordingly, it is possible to determine that inputting is performed when the finger is pressed against and inputting is not performed when the finger is unintentionally touched to the touch panel.

In addition, in FIG. 11B, when the threshold value is 8, it is determined that inputting is performed on the pixel groups 1104 and 1107 and is not performed on the pixel group 1106. In the case where this system is applied, an input can be detected even when there is a plurality of input portions, which leads to improvement of the function of the touch panel.

Further, a plurality of threshold values are set with respect to the areas and multi-level detection of inputs to the touch panel may be performed by a comparison between the area and threshold values.

For example, when first and second threshold values are set, it is determined that inputting is not performed in the case where the area is equal to or less than the first threshold value, weak inputting is performed in the case where the area exceeds the first threshold value and is equal to or less than the second threshold value, and strong inputting is performed in the case where the area exceeds the second threshold value.

In this manner, a plurality of threshold values are set and multi-level detection is performed, so that more accurate detection of input can be performed.

This multi-level detection is applied to area information of FIG. 11B. When the first threshold value is 8 and the second threshold value is 10, not only input of the two places of the groups 1104 and 1107 is detected, but also the strength of the input can be detected, so that the function of the touch panel can be further improved.

The response process portion 114 forms a response image based on information from the input process portion 113 in order that the response image may be displayed on a panel.

For example, a process for displaying a circle at the place to which a finger is touched on the basis of location information can be given.

In addition, a switch image is displayed and a switch is regarded as being pressed when location information of the finger can be obtained at the place of the switch image. The switching can be performed in the touch panel 100.

The image synthesis portion 115 has a function to form a synthesis image of an image displayed on the touch panel 100 and a response image formed in the response process portion 114.

The synthesis image outputted from the image synthesis portion 115 is inputted to and displayed on the touch panel 100.

Note that it is not necessary to form a response image. Voice, lamp, or the like may transmit whether inputting is performed or not. When the response image is not formed, the image synthesis portion 115 need not be provided.

This embodiment can be implemented by combining it with any of the other embodiments as appropriate.

(Embodiment 3)

Next, an example of a detailed circuit structure of a touch panel will be described with reference to FIG. 1 to FIG. 4.

In FIG. 1, the touch panel 100 includes a pixel circuit 101, a display element control circuit 102, and a photosensor control circuit 103. The pixel circuit 101 includes the plurality of pixels 104 arranged in a matrix in rows and columns. Each of the pixels 104 includes the display element 105 and the photosensor 106.

Each of the display elements 105 includes a thin film transistor (TFT), a storage capacitor, a liquid crystal element including a liquid crystal layer, and the like. The thin film transistor has the function for controlling injection or ejection of charge to/from the storage capacitor. The storage capacitor has a function for holding charge which corresponds to voltage applied to the liquid crystal layer. Taking advantage of the change in the direction of a polarization due to a voltage application to the liquid crystal layer, contrast (gray scale) of light passing through the liquid crystal layer is made, so that image display is realized. Light that a light source (a backlight) emits from the rear side of a liquid crystal display device is used as the light which passes through the liquid crystal layer.

Note that a method using a color filter, namely, a color filter method may be used in order to display a color image, for example. This method makes it possible to produce the gray scale of a particular color (e.g., red (R), green (G), or blue (B)) when light that has passed through the liquid crystal layer passes through a color filter. Here, when the color filter method is employed, the pixel 104 that has the function for emitting red (R) light, the pixel 104 that has the function for emitting green (G) light, and the pixel 104 that has the function for emitting blue (B) light are called an R pixel, a G pixel, and a B pixel, respectively.

Note that the case where each of the display elements 105 includes a liquid crystal element is described above; however, other elements such as a light emitting element may be included instead. Light emitting elements are elements whose luminance is controlled by current or voltage; specifically, light emitting diodes, OLEDs (organic light emitting diodes), and the like can be given.

The photosensor 106 includes a thin film transistor and an element such as a photodiode which has a function for generating an electric signal by receiving light. Note that the photosensor 106 receives reflective light and forms an image of the object when an object such as a finger which light reaches from a back light.

The display element control circuit 102 is a circuit for controlling the display elements 105 and includes a display element driver circuit 107 which inputs a signal to the display elements 105 through signal lines (also referred to as source signal lines) such as video-data signal lines; and a display element driver circuit 108 which inputs a signal to the display elements 105 through scanning lines (also referred to as gate signal lines). For example, the display element driver circuit 108 for driving the scanning line has the function for selecting the display elements included in the pixels placed in a particular row. The display element driver circuit 107 for driving the signal line has the function for applying an predetermined potential to the display elements included in the pixels placed in a selected row. Note that in the display element to which the display element driver circuit 108 for driving the scanning line applies high potential, the thin film transistor is conducting, so that the display element is provided with charge from the display element driver circuit 107 for driving the signal line.

The photosensor control circuit 103 is a circuit for controlling the photosensors 106 and includes a photosensor read out circuit 109 for driving a signal line such as a photosensor output-signal line or a photosensor reference signal line; and a photosensor driver circuit 110 for driving the scanning line. For example, the photosensor driver circuit 110 for driving the scanning line has the function for selecting the photosensors 106 included in the pixels placed in a predetermined row. Further, the photosensor read out circuit 109 for driving the signal line has a function for taking out an output signal of the photosensors 106 included in the pixels in the selected line. Note that the photosensor read out circuit 109 for driving the signal line can have a system in which an output, which is an analog signal, of the photosensor is extracted as an analog signal to the outside of the touch panel by an OP amplifier; or a system in which the output is converted into a digital signal by an A/D converter circuit and then extracted to the outside of the touch panel.

Figure 2:
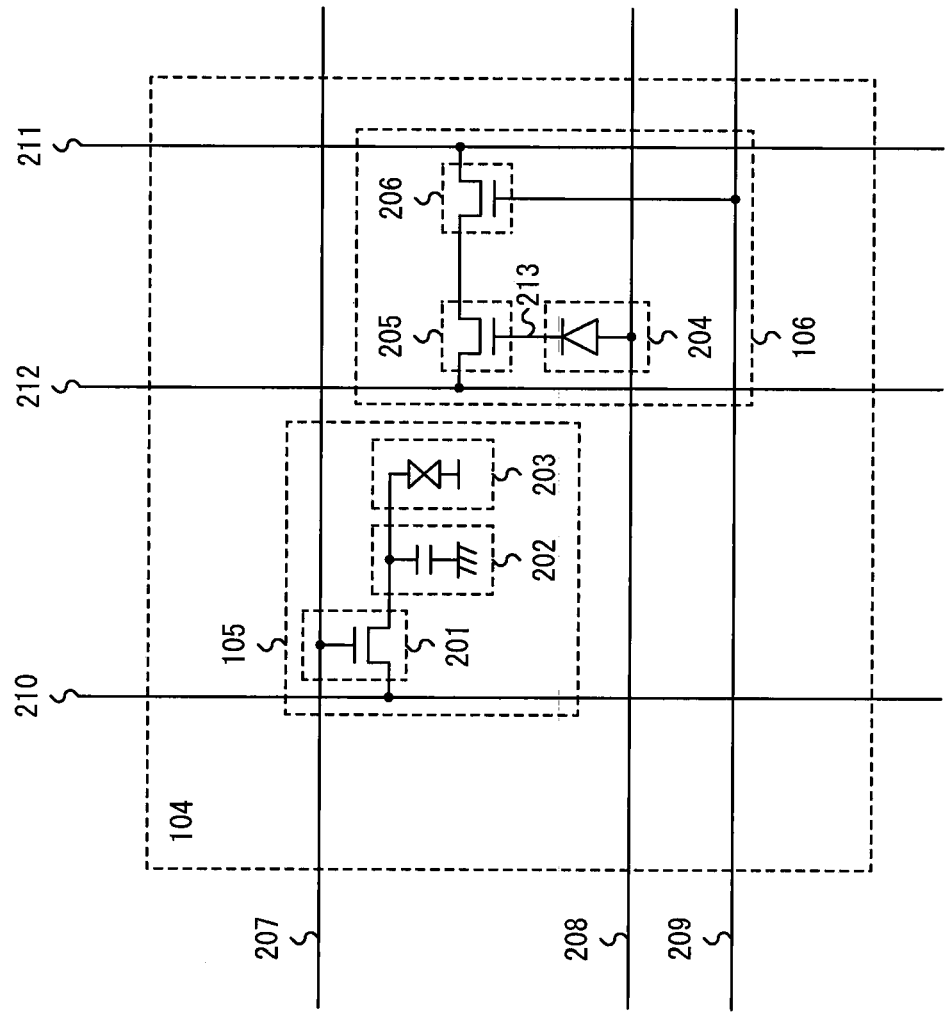
FIG. 2 illustrates a structure of a touch panel.

A circuit diagram of the pixel 104 will be described with reference to FIG. 2. The pixel 104 includes the display element 105 including a transistor 201, a storage capacitor 202, and a liquid crystal element 203; and the photosensor 106 including a photodiode 204, a transistor 205, and a transistor 206.

A gate of the transistor 201 is electrically connected to a gate signal line 207, one of a source and a drain of the transistor 201 is electrically connected to a video data signal line 210, and the other of the source and the drain of the transistor 201 is electrically connected to one of electrodes of the storage capacitor 202 and one of electrodes of the liquid crystal element 203. The other of electrodes of the storage capacitor 202 and the other of the electrodes of the liquid crystal element 203 are each held at a certain potential. The liquid crystal element 203 includes a pair of electrodes and a liquid crystal layer sandwiched between the pair of electrodes.

In the transistor 201, when "High" (a potential at a high level) is applied to the gate signal line 207, a potential of the video data signal line 210 is applied to the storage capacitor 202 and the liquid crystal element 203. The storage capacitor 202 holds the applied potential. The liquid crystal element 203 changes light transmittance in accordance with the applied potential.

One of electrodes of the photodiode 204 is electrically connected to a photodiode reset signal line 208, and the other of the electrodes of the photodiode 204 is electrically connected to a gate of the transistor 205. One of a source and a drain of the transistor 205 is electrically connected to a photosensor reference signal line 212, and the other of the source and the drain of the transistor 205 is electrically connected to one of a source and a drain of the transistor 206. A gate of the transistor 206 is electrically connected to a gate signal line 209, and the other of the source and the drain of the transistor 206 is electrically connected to a photosensor output signal line 211.

Figure 3:
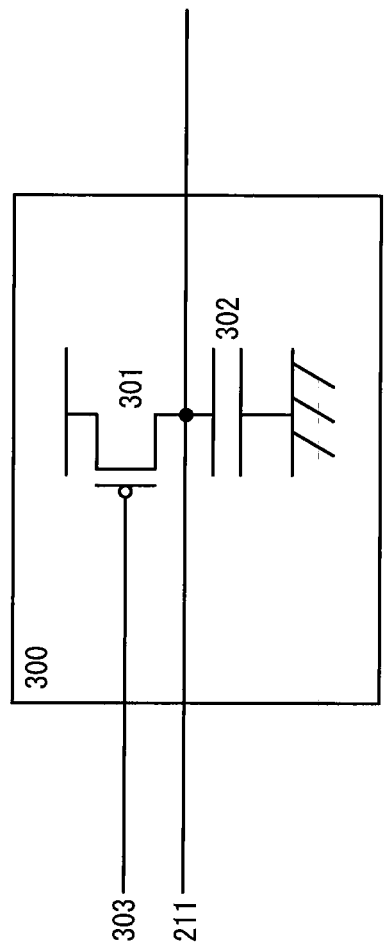
FIG. 3 illustrates a structure of a touch panel.

Next, a structure of the photosensor read out circuit 109 will be described with reference to FIG. 3. In FIG. 3, a photosensor read out circuit 300 for one column of pixels includes a p-type TFT 301 and a storage capacitor 302. Further, the photosensor read out circuit 300 includes the photosensor output signal line 211 and a precharge signal line 303 which are for the one column of pixels.

In the photosensor read out circuit 300, the potential of a photosensor signal line 211 is set at a reference potential before the operation of the photosensor in the pixel. In FIG. 3, the potential of the precharge signal line 303 is set at a potential "Low" (a potential at a low level), whereby the potential of the photosensor output signal line 211 can be set at a high potential which is the reference potential. Note that the storage capacitor 302 is not necessarily provided if the photosensor output signal line 211 has large parasitic capacitance. Note that the reference potential can be a low potential. In this case, the use of an n-type TFT makes the potential of the precharge signal line 303 "High", whereby the potential of the photosensor output signal line 211 can be set at a low potential which is the reference potential.

Figure 4:
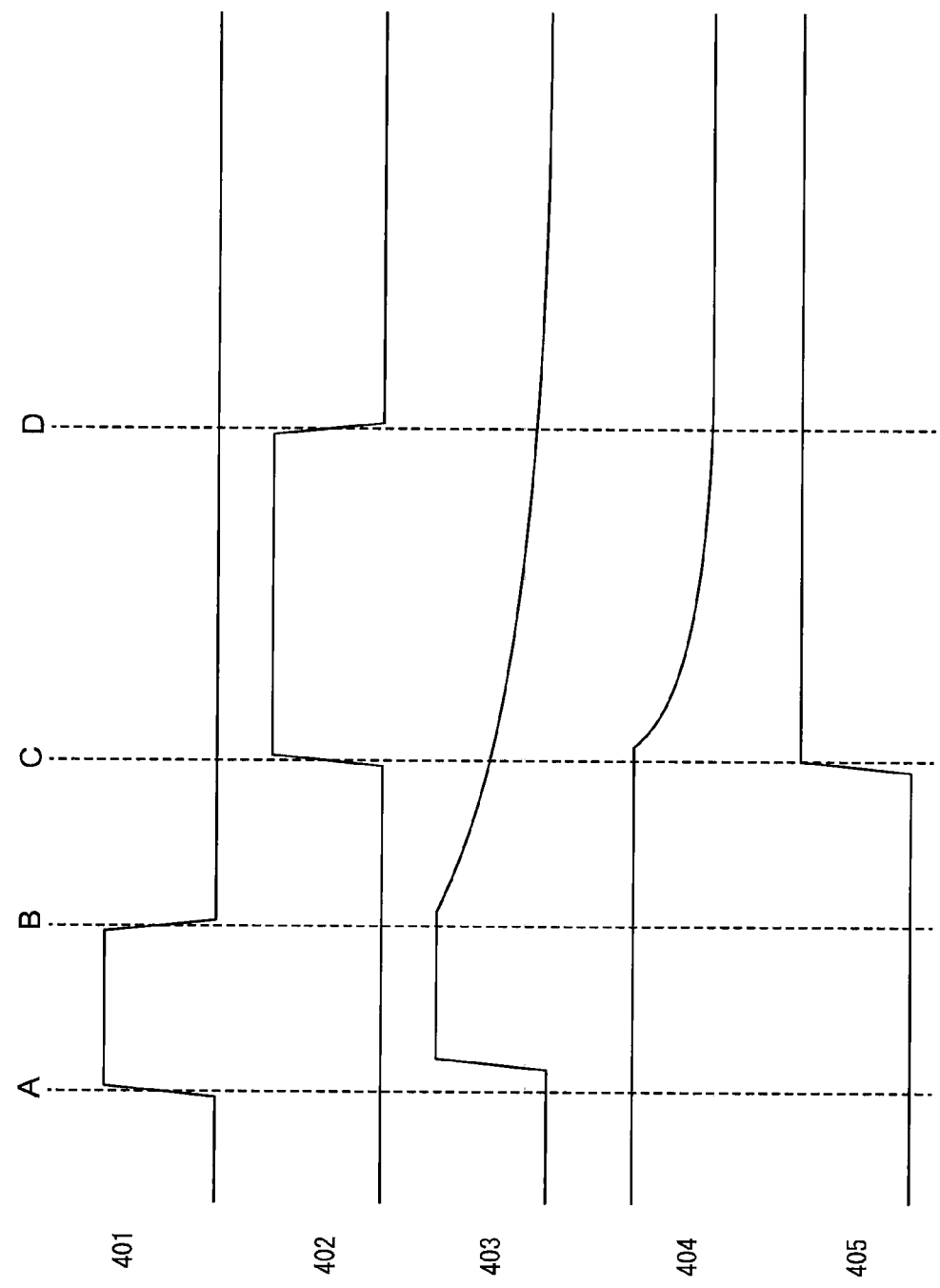
FIG. 4 is a timing chart.

Next, a reading operation of the photosensor of the touch panel will be described with reference to a timing chart in FIG. 4. In FIG. 4, a signal 401 corresponds to the potential of the photodiode reset signal line 208 in FIG. 2, a signal 402 corresponds to the potential of the gate signal line 209 in FIG. 2 to which the gate of the transistor 206 is connected, a signal 403 corresponds to the potential of a gate signal line 213 in FIG. 2 to which the gate of the transistor 205 is connected, and a signal 404 corresponds to the potential of the photosensor output signal line 211 in FIG. 2. Further, a signal 405 corresponds to the potential of the precharge signal line 303 in FIG. 3.

At a time A, when the potential of the photodiode reset signal line 208 (the signal 401) is set at "High", the photodiode 204 conducts, and the potential of the gate signal line 213 (the signal 403) to which the gate of the transistor 205 is connected becomes "High". Further, when the potential of the precharge signal line 303 (the signal 405) is set at "Low", the potential of the photosensor output signal line 211 (the signal 404) is precharged to "High".

At a time B, when the potential of the photodiode reset signal line 208 (the signal 401) is set at "Low", the potential of the gate signal line 213 (the signal 403) to which the gate of the transistor 205 is connected starts to be lowered because of off current of the photodiode 204. The off current of the photodiode 204 increases when light incident thereon; therefore, the potential of the gate signal line 213 (the signal 403) to which the gate of the transistor 205 is connected changes in accordance with the amount of the light incident on the photodiode 204, that is, a source-drain current of the transistor 205 changes.

At a time C, when the potential of the gate signal line 209 (the signal 402) is set at "High", the transistor 206 conducts, and electrical continuity between the photosensor reference signal line 212 and the photosensor output signal line 211 is established through the transistor 205 and the transistor 206. Then, the potential of the photosensor output signal line 211 (the signal 404) decreases. Note that previous to the time C, the potential of the precharge signal line 303 (the signal 405) is set at "Low" and the precharge of the photosensor output signal line 211 is completed. Here, a speed at which the potential of the photosensor output signal line 211 (the signal 404) is lowered depends on the source-drain current of the transistor 205. That is, a speed at which the potential of the photosensor output signal line 211 changes in accordance with the amount of light incident on the photodiode 204.

At a time D, when the potential of the gate signal line 209 (the signal 402) is set at "Low", the transistor 206 is turned off, and the potential of the photosensor output signal line 211 (the signal 404) has a constant value from the time D. Here, the constant value changes in accordance with the amount of light incident on the photodiode 204. Therefore, the amount of light incident on the photodiode 204 can be determined by obtaining the potential of the photosensor output signal line 211.

This embodiment can be implemented combining with any of the other embodiment as appropriate.

(Embodiment 4)

In this embodiment, a structure of the touch panel described in Embodiments 1 to 3 is described with reference to FIG. 5 and FIG. 6. In this embodiment, the touch panel includes a photosensor and a display element. The display element includes a liquid crystal element or a light emitting element.

Figure 5:
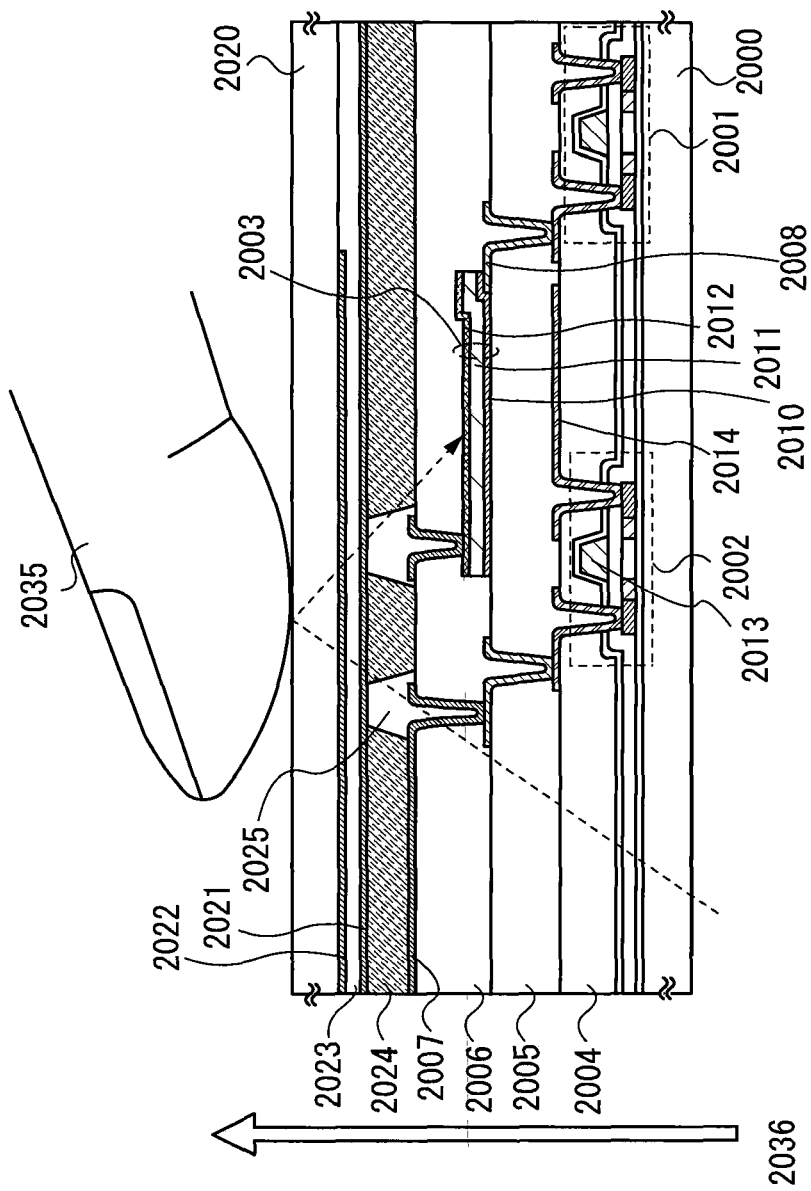
FIG. 5 is a cross-sectional view of a touch panel.

FIG. 5 illustrates, in the touch panel described in Embodiments 1 to 3, an example of the cross-sectional view of a liquid crystal display device in which a display element includes a liquid crystal element. A state in which light from a backlight is reflected by a finger 2035, which is an object, and the light reaches a photosensor 2003 is shown. The object is not limited to a finger.

As a substrate 2000, a light-transmitting substrate such as a glass substrate or a quartz substrate is used. A thin film transistor 2001, a thin film transistor 2002, and the photosensor 2003 are provided on a substrate 2000. The photosensor 2003 is formed by stacking an n-type semiconductor layer 2010, an i-type semiconductor layer 2011, and a p-type semiconductor layer 2012 in that order. The n-type semiconductor layer 2010 contains an impurity element imparting one conductivity type (e.g., phosphorus). The i-type semiconductor layer 2011 is an intrinsic semiconductor. The p-type semiconductor layer 2012 contains an impurity element imparting another one conductivity type (e.g., boron).

In FIG. 5, top gate thin film transistors are used as the thin film transistors 2001 and 2002; however, this embodiment is not limited to this. As the thin film transistors 2001 and 2002, bottom gate thin film transistors can also be used. Further, the photosensor 2003 has a structure where the n-type semiconductor layer 2010, the i-type semiconductor layer 2011, and the p-type semiconductor layer 2012 are provided; however, this embodiment is not limited to this.

In this embodiment, a crystalline semiconductor layer can be used as each semiconductor layer included in the thin film transistors 2001 and 2002. For example, polycrystalline silicon can be used; however, the present invention is not limited to this. Amorphous silicon, microcrystalline silicon, and single crystal silicon; an organic semiconductor such as pentacene, an oxide semiconductor, or the like may be used as semiconductor layers included in the thin film transistors 2001 and 2002. In order to form a semiconductor layer of single crystal silicon over the substrate 2000, the substrate 2000 is bonded to a single crystal silicon substrate in which a damaged region is provided at a predetermined depth from the surface, and the single crystal silicon substrate is separated at the damaged region to be provided over the substrate 2000. As the oxide semiconductor, a composite oxide of an element selected from indium, gallium, aluminum, zinc, tin, or the like can be used.

An insulating layer 2004 is provided so as to cover the thin film transistors 2001 and 2002. An insulating layer 2005 is provided over the insulating layer 2004, and an insulating layer 2006 is provided over the insulating layer 2005. A pixel electrode 2007 is provided over the insulating layer 2006, and the photosensor 2003 and a lower electrode 2008 are provided over the insulating layer 2005. Owing to the lower electrode 2008, the photosensor 2003 and the thin film transistor 2001 are electrically connected to each other through an opening portion provided in the insulating layer 2005.

In addition, a counter substrate 2020 is provided with a counter electrode 2021, a color filter layer 2022, and an overcoat layer 2023. The counter substrate 2020 and the substrate 2000 are fixed to each other with a sealant, and the substrates are kept at an substantially or exactly constant distance by a spacer 2025. A liquid crystal layer 2024 is sandwiched between the pixel electrode 2007 and the counter electrode 2021, whereby a liquid crystal element is formed.

The color filter layer 2022 may be provided so as to overlap with both the photosensor 2003 and the pixel electrode 2007 as illustrated in FIG. 5.

The photosensor 2003 overlaps with a gate electrode 2013 of the thin film transistor 2002 as illustrated in FIG. 5 and is preferably provided so as to overlap with also a signal line 2014 of the thin film transistor 2002.

A backlight is provided for the liquid crystal display device in this embodiment. In FIG. 5, the backlight is provided on the substrate 2000 side, and light is emitted in a direction indicated by an arrow 2036. As the backlight, a cold cathode fluorescent lamp (CCFL) or a white light-emitting diode can, be used. Since the adjustable range of brightness of a white light-emitting diode is wider than that of a cold-cathode fluorescent lamp, a white light-emitting diode is preferable.

Besides that, the brightness (luminance) of the backlight can be adjusted by providing the photosensor 2003, for example, in a driver circuit portion, for detecting ambient light in order to realize a display which is appropriate for the environment under which the touch panel is used.

In addition, a backlight is not limited to the above structure. For example, a light-emitting diode (LED) of RGB may be used to form a backlight, or color display can be performed in a field sequential mode with sequentially lighting of an LED backlight of RGB. A color filter layer is not necessary in that case.

Here, an example of the method for manufacturing the liquid crystal display device illustrated in FIG. 5 is briefly described.

First, top gate thin film transistors each including a crystalline semiconductor layer as an active layer are formed. Here, the thin film transistor 2002 including the gate electrode 2013 and the thin film transistor 2001 which is electrically connected to the photosensor 2003 are formed over the same substrate. An n-type thin film transistor or a p-type thin film transistor can be used as each transistor. Further, a storage capacitor can be formed through the similar steps to these transistors. Note that the storage capacitor may use the semiconductor layer as a lower electrode and a capacitor wiring as an upper electrode, and an insulating film which is formed in the same step to a gate insulating film of the thin film transistor 2001 and the thin film transistor 2002 as a dielectric.

Further, contact holes are formed in the insulating layer 2004, which is one of interlayer insulating layers of the thin film transistors, and a source electrode and a drain electrode which are electrically connected to the semiconductor layer of each of the thin film transistors or a connection electrode which is electrically connected to an upper wiring is formed. Moreover, a signal line of the thin film transistor 2001, which is electrically connected to the photosensor 2003, is formed in the similar steps. Further, the signal line 2014 of the thin film transistor 2002 is also formed in the similar steps.

Next, the insulating layer 2005 which covers the signal line 2014 is formed. Note that in this embodiment, since a transmissive liquid crystal display device is shown as an example, the insulating layer 2005 is formed of an insulating material through which visible light can pass. Then, a contact hole is formed in the insulating layer 2005, and the lower electrode 2008 is formed over the insulating layer 2005.

Then, the photosensor 2003 is formed so as to overlap with at least part of the lower electrode 2008. The lower electrode 2008 is an electrode for electrically connecting the photosensor 2003 and the thin film transistor 2001. The photosensor 2003 is formed by stacking the n-type semiconductor layer 2010, the i-type semiconductor layer 2011, and the p-type semiconductor layer 2012 in that order. In this embodiment, microcrystalline silicon containing phosphorus, amorphous silicon, and microcrystalline silicon containing boron are stacked as the n-type semiconductor layer 2010, the i-type semiconductor layer 2011, and the p-type semiconductor layer 2012, respectively, by a plasma CVD method.

Next, the insulating layer 2006 which covers the photosensor 2003 is formed. In the case of a transmissive liquid crystal display device, the insulating layer 2006 is formed of an insulating material through which visible light can pass. Then, a contact hole is formed in the insulating layer 2006, and the pixel electrode 2007 is formed over the insulating layer 2006. A wiring is formed using the same layer as the pixel electrode 2007. The wiring is electrically connected to the p-type semiconductor layer 2012, which is an upper electrode of the photosensor 2003.

Next, the spacer 2025 is formed over the insulating layer 2006. Although a columnar spacer (a post spacer) is provided as the spacer 2025 in FIG. 5, a spherical spacer (a bead spacer) may be alternatively used.

Then, when a TN liquid crystal or the like is used as the liquid crystal layer 2024, an alignment film is formed over the pixel electrode 2007 by coating, and rubbing treatment is performed thereon.

Meanwhile, the color filter layer 2022, the overcoat layer 2023, and the counter electrode 2021 are formed over the counter substrate 2020. Then, an alignment film is formed over the counter electrode 2021 by coating, and rubbing treatment is performed thereon.

After that, a surface of the substrate 2000, over which the alignment film is formed by coating, and a surface of the counter substrate 2020, over which the alignment film is formed by coating, are attached to each other with a sealant. A liquid crystal is placed between these substrates by a liquid crystal dropping method or a liquid crystal injection method, whereby the liquid crystal layer 2024 is formed.

Note that a liquid crystal exhibiting a blue phase for which an alignment film is not necessary may be used for the liquid crystal layer 2024. A blue phase is one of liquid crystal phases, which is generated just before a cholesteric phase changes into an isotropic phase while temperature of a cholesteric liquid crystal is increased. Since the blue phase appears only in a narrow temperature range, in order to use the blue phase liquid crystal in the liquid crystal layer 2024, a chiral material is mixed into the blue phase liquid crystal composition at 5 wt. % or more to broaden the temperature range. As for the liquid crystal composition which contains a liquid crystal exhibiting a blue phase and a chiral material, the response speed is as high as 10 µs to 100 µs, alignment treatment is not necessary due to optical isotropy, and viewing angle dependence is low.

Next, in the touch panel described in Embodiments 1 and 2, an electroluminescent display device (hereinafter referred to as an "EL display device") which has a display element including a light-emitting element will be described.

Figure 6:
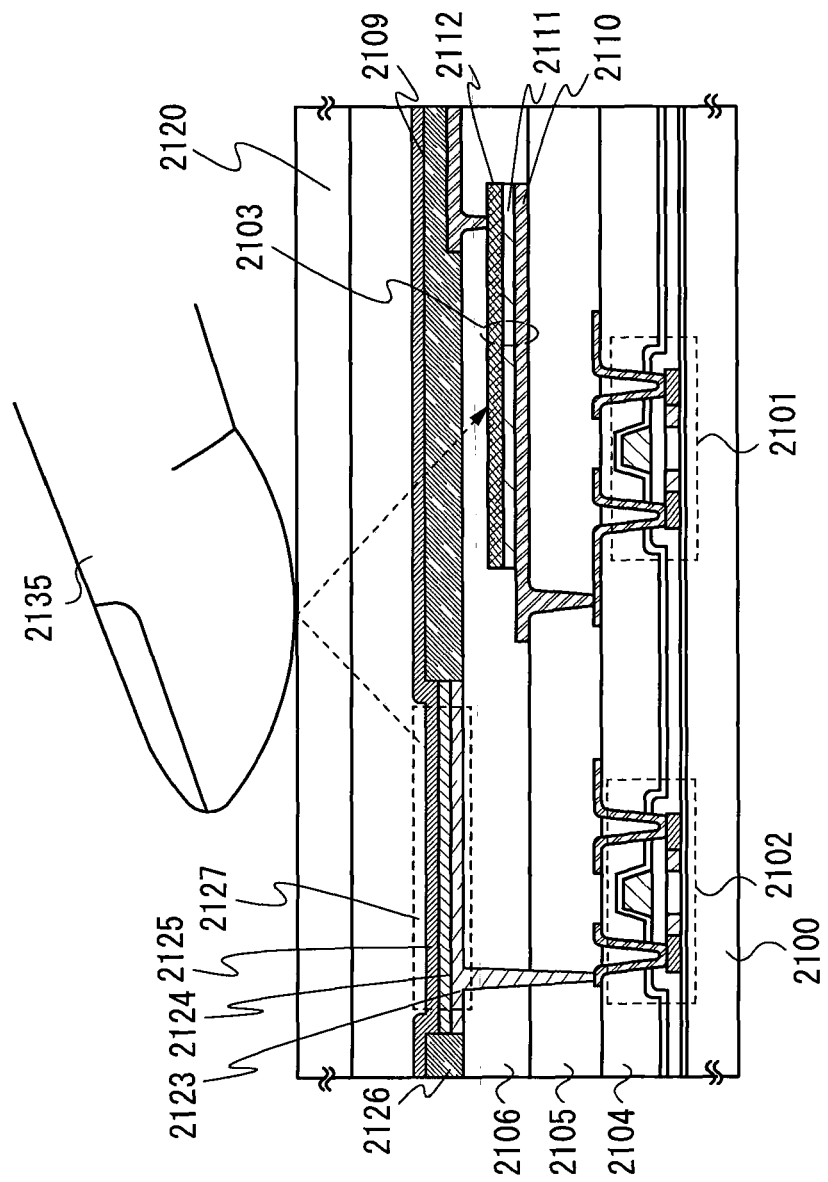
FIG. 6 is a cross-sectional view of a touch panel

FIG. 6 illustrates an example of the cross-sectional view of an EL display element using an EL element (for example, an organic EL element, an inorganic EL element, or an EL element including an organic substance and an inorganic substance) as a light-emitting element in the touch panel. A state in which light emitted from an EL element 2127 is reflected by a finger 2135, which is an object, and the light reaches a photosensor 2103 is shown. The object is not limited to a finger.

In FIG. 6, a thin film transistor 2101, a thin film transistor 2102, and the photosensor 2103 are provided over a substrate 2100. The photosensor 2103 is formed by stacking an n-type semiconductor layer 2110, an i-type semiconductor layer 2111, and a p-type semiconductor layer 2112. The substrate 2100 is fixed to a counter substrate 2120 by a sealant.

An insulating layer 2104 is provided so as to cover the thin film transistors 2101 and 2102. An insulating layer 2105 is provided over the insulating layer 2104, and an insulating layer 2106 is provided over the insulating layer 2105. The EL element 2127 is provided over the insulating layer 2106, and the photosensor 2103 is provided over the insulating layer 2105. The photosensor 2103 and the thin film transistor 2101 are electrically connected to each other using the n-type semiconductor layer 2110 of the photosensor 2103 through an opening provided in the insulating layer 2105.

Further, a sensor wiring 2109 electrically connects the p-type semiconductor layer 2112 and another wiring.

The EL element 2127 is formed by stacking a pixel electrode 2123, a light-emitting layer 2124, and a counter electrode 2125 in that order. Note that light-emitting layers of adjacent pixels are divided by a bank 2126.

Either an n-type thin film transistor or a p-type thin film transistor can be used as each of the thin film transistor 2101 and the thin film transistor 2102. In the case where the pixel electrode 2123 functions as a cathode, the thin film transistor 2102 which is electrically connected to the pixel electrode 2123 is preferably an n-type thin film transistor in considering the direction of current. Further, in the case where the pixel electrode 2123 functions as an anode, the thin film transistor 2102 is preferably a p-type thin film transistor.

This embodiment can be implemented combining with any of the other embodiment as appropriate.

(Embodiment 5)

In this embodiment, the touch panel with a structure which is different from the structure illustrated in Embodiment 4 will be described with reference to FIG. 7.

Figure 7:
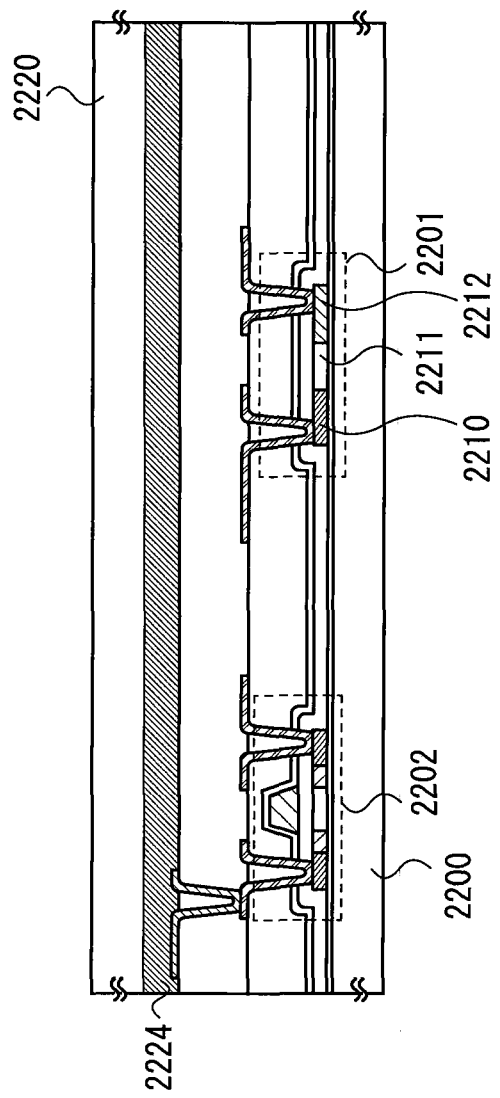
FIG. 7 is a cross-sectional view of a touch panel.

In FIG. 7, a photosensor 2201, a thin film transistor 2202, and a layer 2224 including a liquid crystal element or a light-emitting element are provided between a substrate 2200 and a counter substrate 2220. The photosensor 2201 includes a semiconductor layer including an n-type region 2210, an i-type region 2211, and a p-type region 2212.

The photosensor 2201 is provided in the same layer as the thin film transistor 2202, which is different from Embodiment 4. Further, the photosensor 2201 has a structure in which the n-type region 2210, the i-type region 2211, and the p-type region 2212 are formed in one semiconductor layer.

By employing the structure in FIG. 7, the semiconductor layers of the photosensor 2201 and the thin film transistor 2202 can be formed in the same steps, so that the number of steps can be reduced.

A crystalline semiconductor layer can be used for each semiconductor layer of the photosensor 2201 and the thin film transistor 2202. For example, polycrystalline silicon can be used but the present invention is not limited to this. Amorphous silicon, microcrystalline silicon, single crystal silicon, an organic semiconductor such as pentacene, an oxide semiconductor, or the like can be used as the semiconductor layers included in the photosensor 2201 and the thin film transistor 2202.

Note that in order to form a semiconductor layer of single crystal silicon over the substrate 2200, the substrate 2200 is bonded to a single crystal silicon substrate in which a damaged region is provided at a predetermined depth from the surface, and the single crystal silicon substrate is separated at the damaged region to be provided over the substrate 2200. In the case where single crystal silicon is used, the photosensor 2201 has extremely high charge accumulation capability, the size of the photosensor 2201 is reduced, whereby the aperture ratio of pixels can be large.

Further, as the oxide semiconductor, a composite oxide of an element selected from indium, gallium, aluminum, zinc, tin, or the like can be used.

In addition, the semiconductor layer of the photosensor 2201 is formed to have a larger thickness than the thin film transistor 2202, so that the charge storage capability of the photosensor 2201 can be enhanced, which is especially effective in the case of using single crystal silicon.

Note that a material for forming the semiconductor layer of the photosensor 2201 may be different from a material for forming the semiconductor layer in the thin film transistor 2202.

This embodiment can be implemented combining with any of the other embodiment as appropriate.

(Embodiment 6)

Examples of electronic devices using a touch sensor or a touch panel will be described in this embodiment with reference to FIGS. 12A to 12D.

Figure 12A:
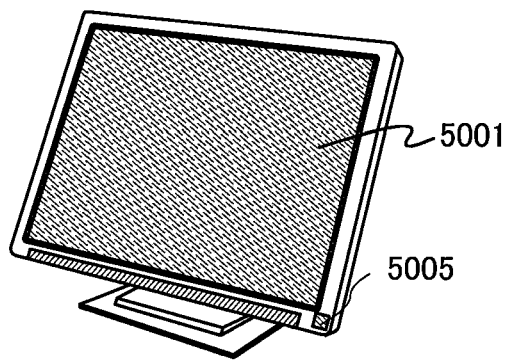
FIGS. 12A to 12D each illustrate an electronic device of the present invention.
Figure 12B:
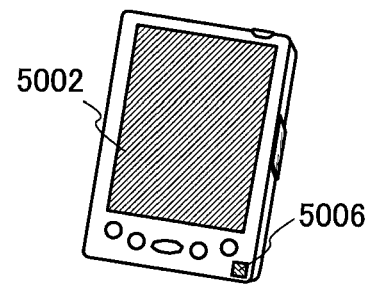
Figure 12C:
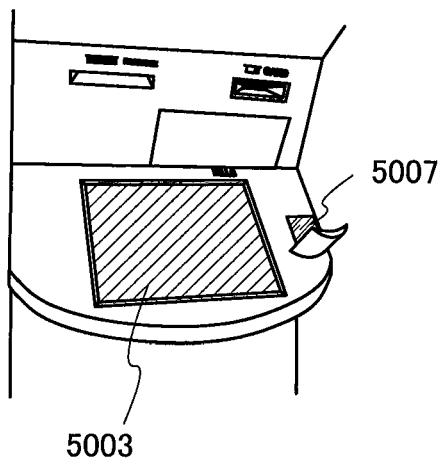
Figure 12D:
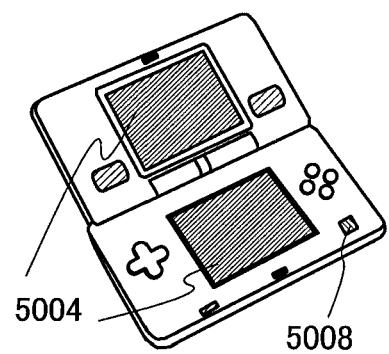

FIG. 12A illustrates a display device. The display device may be all of display devices for displaying information such as those for personal computers, television broadcast reception, and advertisement. FIG. 12B illustrates a portable information terminal. FIG. 12C illustrates an automated teller machine. FIG. 12D illustrates a portable game machine. A touch panel relating to an embodiment of the present invention can be used for each of display portions 5001 to 5004 of electronic devices in FIGS. 12A to 12D. Further, a touch sensor relating to an embodiment of the present invention can be used for each of authenticator portions 5005 to 5008 of electronic devices in FIGS. 12A to 12D.

This embodiment can be implemented combining with any of the other embodiment as appropriate.

(Embodiment 7)

An example of electronic device using a touch sensor or a touch panel will be described with reference to FIG. 13.

Figure 13:
FIG. 13 illustrates an electronic device of the present invention.

FIG. 13 illustrates a writing board (e.g., a black board and a white board). A touch panel (or a touch sensor) relating to an embodiment of the present invention can be provided in a writing portion 9101 of a main body 9001.

Here, it is possible to write freely on a surface of the writing portion 9101 with a marker pen or the like.

Note that when a marker pen which does not include fixative is used, a letter can be erase easily.

Further, in order that ink of a marker pen may be erase easily, it is preferable that the writing portion 9101 have a sufficient smooth surface.

For example, when the surface of the writing portion 9101 is a glass substrate or the like, the smoothness is sufficient.

Further, a transparent synthetic resin sheet or the like is attached to the surface of the writing portion 9101.

It is preferable that acrylic or the like be used as a synthetic resin. In this case, it is preferable the synthetic resin sheet have a smooth surface.

Further, when the writing portion 9101 performs specific display, the user can write or draw on the surface. Furthermore, the writing portion 9101 can superimpose a displayed image with the drawing or the letter.

Furthermore, since a photosensor is used, sensing is possible even after time have passed after drawing or writing is performed. When a resistive touch sensor, a capacitance touch sensor, and the like are used, sensing can be performed only at the same time as writing is performed.

This embodiment can be implemented combining with any of the other embodiment as appropriate.

This application is based on Japanese Patent Application serial no. 2009-193248 filed with Japan Patent Office on Aug. 24, 2009, the entire contents of which are hereby incorporated by reference.

What is claimed is:

1. A display device comprising:
   a touch panel comprising a pixel circuit, the pixel circuit comprising a pixel; and
   an image processing portion including an input process portion and a response process portion, wherein the pixel comprises a photosensor and a display element,
   wherein the photosensor is configured to form a contact image of a portion where the touch panel is touched by a finger, wherein the input process portion is configured to calculate an area of a contact portion from color data of the contact image,
   wherein the input process portion comprises a circuit for calculating an input pressure from the area which is calculated from the color data of the contact image,
   wherein the response process portion is configured to detect an input to the touch panel based on the area, and
   wherein a plurality of threshold values are set for an area and an input to the touch panel is detected in multi-level depending on the result of the comparison between the area and the threshold values.

2. The display device according to claim 1, wherein the display element comprises a transistor, and a liquid crystal element or a light emitting element.

3. The display device according to claim 2,
   wherein the transistor has an oxide semiconductor, and
   wherein the oxide semiconductor comprises a material selected from the group consisting of indium, gallium, aluminum, zinc, and tin.

4. The display device according to claim 1,
   wherein the photosensor comprises a photodiode, a first transistor, and a second transistor,
   wherein one of electrodes of the photodiode is electrically connected to a photodiode reset signal line,
   wherein the other of the electrodes of the photodiode is electrically connected to a gate of the first transistor,
   wherein one of a source and a drain of the first transistor is electrically connected to a photosensor reference signal line,
   wherein the other one of the source and the drain of the first transistor is electrically connected to one of a source and a drain of the second transistor,
   wherein a gate of the second transistor is electrically connected to a gate signal line, and
   wherein the other one of the source and the drain of the second transistor is electrically connected to a photosensor output signal line.

5. A display device comprising:
   a touch panel comprising a pixel circuit, the pixel circuit comprising a pixel; and
   an image processing portion including an input process portion and a response process portion,
   wherein the pixel comprises a photosensor and a display element comprising a light emitting element,
   wherein the photosensor is configured to form a contact image of a portion where the touch panel is touched by a finger,
   wherein the input process portion is configured to calculate an area of a contact portion by subjecting color data of the contact image to a converting process from RGB value to HSV value, a binarizing process, a noise removing process, and a labeling process,
   wherein the input process portion comprises a circuit for calculating an input pressure from the area which is calculated from the color data of the contact image,
   wherein the response process portion is configured to detect an input to the touch panel based on the area, and
   wherein a plurality of threshold values are set for an area and an input to the touch panel is detected in multi-level depending on the result of the comparison between the area and the threshold values.

6. The display device according to claim 5, wherein the display element further comprises a transistor.

7. The display device according to claim 6,
   wherein the transistor has an oxide semiconductor, and
   wherein the oxide semiconductor comprises a material selected from the group consisting of indium, gallium, aluminum, zinc, and tin.

8. The display device according to claim 5,
   wherein the photosensor comprises a photodiode, a first transistor, and a second transistor,
   wherein one of electrodes of the photodiode is electrically connected to a photodiode reset signal line,
   wherein the other of the electrodes of the photodiode is electrically connected to a gate of the first transistor,
   wherein one of a source and a drain of the first transistor is electrically connected to a photosensor reference signal line,
   wherein the other one of the source and the drain of the first transistor is electrically connected to one of a source and a drain of the second transistor,
   wherein a gate of the second transistor is electrically connected to a gate signal line, and
   wherein the other one of the source and the drain of the second transistor is electrically connected to a photosensor output signal line.

* * * * *